United States Patent [19]

Takano

[11] Patent Number: 4,581,657
[45] Date of Patent: Apr. 8, 1986

[54] IMAGE READING DEVICE

[75] Inventor: Tadashi Takano, Yokohama, Japan

[73] Assignee: Canon Kabushiki Kaisha, Tokyo, Japan

[21] Appl. No.: 521,348

[22] Filed: Aug. 8, 1983

[30] Foreign Application Priority Data

Aug. 12, 1982 [JP] Japan .......................... 57-122554[U]

[51] Int. Cl.$^4$ ......................... H04N 1/04; H04N 1/10
[52] U.S. Cl. .................................. 358/285; 358/229; 358/293; 382/65; 250/239
[58] Field of Search ....................... 250/239, 563, 578; 358/98, 212, 213, 229, 293, 294, 285; 382/65, 67, 45

[56] References Cited

U.S. PATENT DOCUMENTS

| | | | |
|---|---|---|---|
| 3,226,557 | 12/1965 | Goodman | 250/239 |
| 3,757,127 | 9/1973 | Dhaka | 250/239 |
| 4,318,135 | 3/1982 | Ellis et al. | 338/294 |
| 4,385,325 | 5/1982 | Chen | 358/294 |
| 4,457,017 | 6/1984 | Onogi et al. | 250/578 |
| 4,479,149 | 10/1984 | Yoshioka et al. | 358/293 |

FOREIGN PATENT DOCUMENTS 102159  8/1981  Japan .

Primary Examiner—James J. Groody
Assistant Examiner—John K. Peng
Attorney, Agent, or Firm—Fitzpatrick, Cella, Harper & Scinto

[57] ABSTRACT

An image reading device in which a solid-state image pick up element is mounted on a reference plane of a support member which is in turn maintained in pressure contact with a reference plane of a substrate. The solid-state image sensor is thus fixed at a determined position.

7 Claims, 4 Drawing Figures

IMAGE READING DEVICE

BACKGROUND OF THE INVENTION

1. Field of the Invention

The present invention relates to an image reading device utilizing a solid-state image pick up element as a charge-coupled device (CCD) or an MOS image sensor.

2. Description of the Prior Art

An image, for example of an original document, is focused on a light receiving surface of a solid-state image pick up element through a projection optical system composed of a lens, in combination, if necessary, with mirrors, filters, etc. Consequently the light receiving surface of said solid-state image pick up element has to be precisely set on the optimum image plane of said optical system.

The photoelectric converting part of the solid-state image pick up element is usually sealed hermetically in a package similar to that employed in the integrated circuits, but the connecting terminals for supplying the photoelectric converting part with necessary signals and for extracting output signals from the image pick up element are exposed to the exterior of said package, and such solid-state image pick up element has often been fixed by soldering such connecting terminals directly on a printed circuit board.

However, such solid-state image pick up element is merely removably placed on the printed circuit board before such soldering, so that it frequently happens that the image pick up element is fixed by the soldering in an inappropriate position, lifted at one or both ends thereof, or that the printed circuit board is fixed in a bent state, because of the insufficient flatness of the board. Consequently, in order to set the light receiving surface of the solid-state image pick up element at the optimum image plane, there have been required, upon fixation of the printed circuit board to a substrate, an adjustment for displacing the solid-state image pick up element in the photo-axial direction, and an angular adjustment for maintaining the light receiving surface of the solid-state image pick up element parallel to the optimum image plane. There have therefore been required a complicated mechanism for adjustment and a cumbersome adjusting procedure.

As an example of prior technologies, the Japanese Patent Laid-open No. 102159/1981 discloses a method of placing an elastic member between the substrate and the printed circuit board and maintaining the light receiving surface of the solid-state image pick up element in pressure contact with a reference plane of a transparent glass plate provided on said substrate utilizing elasticity of the elastic member. This method reduces the influence of the fixing state of the solid-state image pick up element on the printed circuit board and of the bending of the printed circuit board since the light receiving surface of the soild-state image pick up element is maintained in direct contact with the reference plane of the substrate, but it is also associated with certain drawbacks such as lowered reliability and frequent destruction of the image sensor since the light receiving surface thereof is subjected to a strong force.

SUMMARY OF THE INVENTION

An object of the present invention is to provide an image reading device which is not associated with the drawbacks of the conventional image reading devices.

Another object of the present invention is to provide an image reading device allowing precise positioning of the solid-state image pick up element, thereby enabling satisfactory image reading.

Still another object of the present invention is to provide an image reading device allowing precise positioning of the solid-state image pick up element, without applying any undesirable force to the solid-state image pick up element.

Still another object of the present invention is to provide an image reading device capable of preventing the deterioration in the image quality, due for example to a bend in the printed circuit board or an error in the fixation of the solid-state image pick up element on the printed circuit board.

Still other objects and advantages of the present invention will become fully apparent from the following description.

DETAILED DESCRIPTION OF THE PREFERRED EMBODIMENTS

Figure 1:
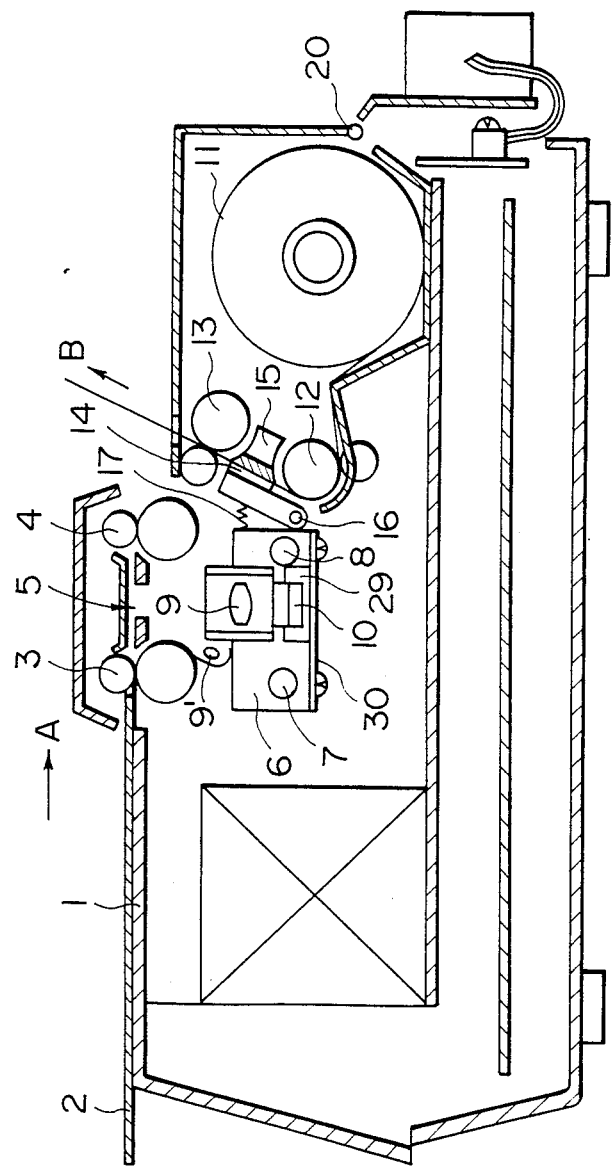
FIG. 1 is a schematic view of a facsimile apparatus embodying the present invention.

Referring to FIG. 1, showing a facsimile apparatus, as an example embodying the present invention, an original document 2 placed on an original carriage 1 is intermittently advanced in the direction of arrow A by means of two pairs of transport rollers 3 and 4. Each time said original document is stopped in the course of the above-mentioned displacement, a carriage 6 performs a reciprocating motion along guide shafts 7 and 8 in a direction perpendicular to the direction A of original displacement, thus scanning a part of the original positioned in an exposure aperture 5. On said carriage 6 there are provided an imaging lens 9, an illuminating lamp 9' and a solid-state image pick up element 10 whereby the image of the original document illuminated by said lamp 9' is focused through the imaging lens 9 onto the solid-state image pick up element 10. Said solid-state image pick up element 10 generates electric signals corresponding to the original image, and said signals are processed in already known circuits and transmitted to a receiving and recording apparatus. Upon completion of a cycle of the reciprocating motion of said carriage 6, the original document is advanced in the direction A by a distance corresponding to the image reading width, and the image scanning is repeated in this manner.

On the other hand, a recording material 11 such as thermal recording paper, etc., in roll form is advanced in the direction of arrow B by paired transport rollers 12, 13 and finally is discharged from the apparatus. In the course of said displacement, the recording material 11 is maintained between a recording head 14, for example a thermal recording head, and a platen 15 facing the head 14 and the printing operation is conducted by said recording head driven by signals supplied during the reciprocating motion of the carriage 6, which supports said recording head 14. The recording head 14 is rotatably supported by a shaft 16 provided on the carriage 6 and is biased toward the platen by a biasing spring 17.

Figure 2:
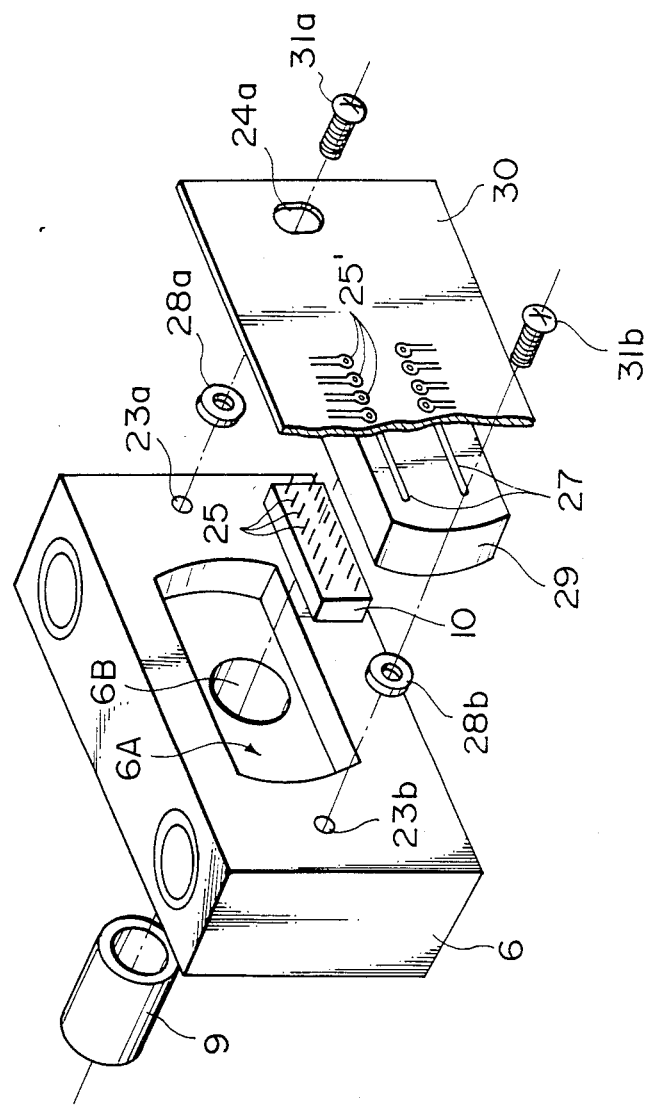
FIG. 2 is an exploded perspective view of the essential parts of an embodiment of the present invention.
Figure 3:
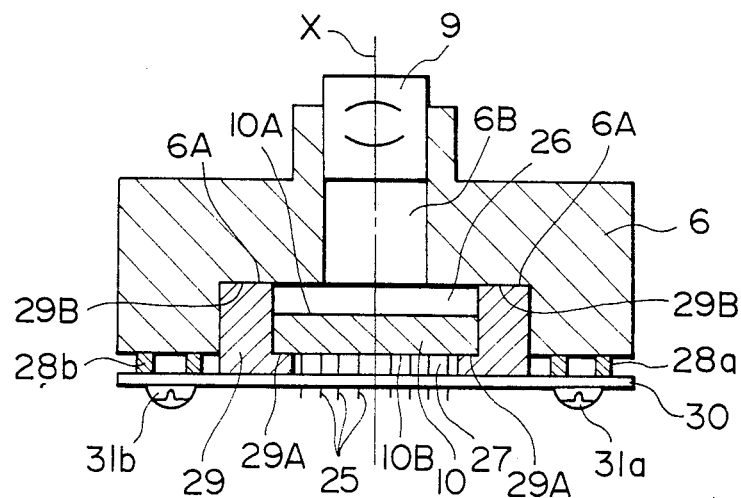
FIG. 3 is a longitudinal cross-sectional view of the essential part of an embodiment of the present invention.

As shown in FIGS. 2 and 3, the solid-state image pick up element 10 is provided with plural terminals 25 constituting pins protruding from a bottom face 10B opposite to a light receiving surface 10A. Said terminals 25 are used for signal supply to and signal reception from the photoelectric converting part of the solid-state image pick up element 10. As shown in FIGS. 2 and 3, the solid-state image pick up element 10 is supported in a recess 26 of a support member 29, while the connecting terminals 25 are inserted in apertures 27 of said support member 29. The bottom face 29A of said recess constitutes means defining a reference plane or surface for positioning the image pick up element 10 on the support member 29, and the bottom face 10B of the image pick up element 10 is maintained in close contact with said face 29A. The depth of said recess 26 is greater than the thickness of the image pick up element 10, so that the light receiving surface 10A is positioned lower than the upper face 29B of the support member 29 when the image pick up element 10 is supported therein. Consequently the light receiving surface 10A of the image pick up element 10 is protected from any strong pressing force. The connecting terminals 25 are inserted in the holes of a printed circuit board 30 bearing, for example, a driving circuit for the image pick up element 10, and are fixed for example by soldering to connecting terminals 25' of said board 30. In this manner the solid-state image pick up element 10 is precisely positioned relative to the support member 29, which is sandwiched between the solid-state image pick up element 10 and the printed circuit board 30.

The upper face 29B of the support member 29 constitutes means defining a reference plane or surface to be maintained in intimate contact with the reference plane or surface 6A of a substrate 6 constituting the aforementioned carriage.

The support member 29 is precisely positioned on the substrate 6 by maintaining said face 6A in intimate contact with the face 29B. Stated differently the solid-state image pick up element 10 is fixed to the substrate 6 in such a manner that the light receiving surface 10A is placed on an optimum image plane for focusing the image of the original document.

In order to ensure precise contact, the support member 29 is elastically pressed against the reference plane 6A of the substrate 6. For this purpose, the printed circuit board 30 is provided with holes 24a, 24b (only 24a being illustrated), and elastic members 28a, 28b such as tubular rubber members or springs, are positioned between the substrate 6 and the printed circuit board 30. The printed circuit board 30 is fixed to the substrate 6 by fitting screws 31a, 31b into threaded holes 23a, 23b of the substrate 6 through said holes 24a, 24b. Upon such fixing, both ends of the printed circuit board 30 are slightly bent elastically while causing deformation of the elastic members 28a, 28b, and the support member 29 is maintained in pressure contact with the substrate 6 by means of the elastic deformation of the printed circuit board 30.

Figure 4:
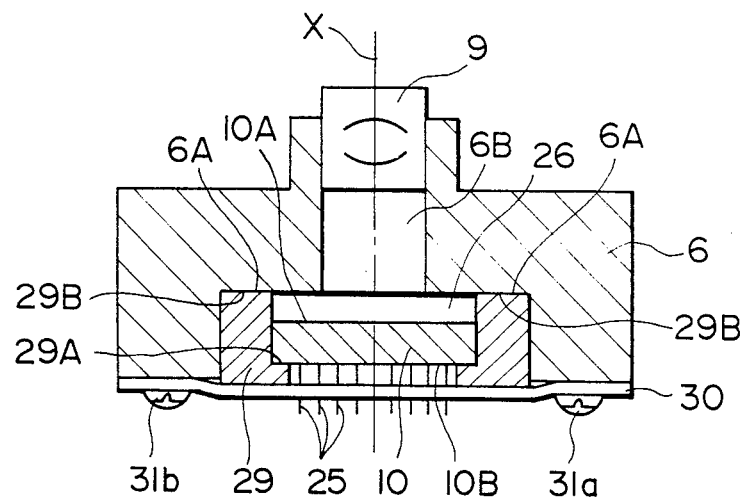
FIG. 4 is a longitudinal cross-sectional view of the essential part of another embodiment of the present invention.

The elastic contact of the faces 6A, 29B can also be achieved, without the elastic members 28a, 28b, by deforming the printed circuit board 30 upon fixation to the substrate as shown in FIG. 4.

The substrate 6 is further provided with an aperture 6B, into which the lens 9 is inserted in a slidable manner in the direction X of the optical axis. After said lens 9 is axially adjusted in such a manner that the image of the original document is focused onto the light receiving element of the image sensor 10, said lens 9 is fixed to the substrate 6 by means of an adhesive material or by other suitable fixing means such as screws. Otherwise the aperture 6B may be provided with a female screw thread which engages with a male screw thread provided on the lens 9, whereby the axial displacement of the lens 9 is achieved by the rotation thereof.

The present invention is by no means limited to the facsimile apparatus but also is applicable for example to an original scanner in a digital copier or a video camera.

What I claim is:

1. An image reading device comprising:
   a solid-state image pick-up element adapted for receiving an image to be read and generating electric signals corresponding to the image, said solid-state image pick up element having a light receiving surface, a face opposite to said light receiving surface and a plurality of pin shaped connection terminals projecting from said face;
   an optical system for projecting the image to be read onto said solid-state image pick up element;
   a support member for supporting said solid-state image pick up element, said support member comprising means defining a first reference surface, a second reference surface and a terminal passing aperture for accepting said plural connecting terminals of said solid-state image pick up element, said solid-state image pick up element being maintained with said face in contact with said first reference surface;
   a substrate comprising means defining a third reference surface, said support member being fixed to said substrate in such a manner that said second reference surface is maintained in contact with said third reference surface;
   a printed circuit board to which are fixed said plural connecting terminals of said solid-state image pick up element passing through said terminal passing aperture of said support member and which is positioned with said support member between said solid-state image pick up element and said printed circuit board; and
   a fixing means for fixing said printed circuit board to said substrate, said fixing means deforming said printed circuit board, and said printed circuit board urging, by an elastic force produced by that deformation, said support member into press-contact with said third reference surface of said substrate.

2. An image reading device according to claim 1, further comprising an elastic member sandwiched between said printed circuit board and said substrate.

3. An image reading device according to claim 1, wherein said fixing means fixes said printed circuit board to said substrate at a location where said printed circuit board directly contacts said substrate.

4. An image reading device according to any one of claims 1 to 3, wherein said substrate further comprises a mounting area for mounting said optical system.

5. An image reading device according to claim 4, wherein said optical system mounting area of said substrate is adapted to support said optical system such that said optical system is adjustable in the direction of the optical axis of said optical system.

6. An image reading device according to any one of claims 1 to 3, wherein said support member further comprises a recess for containing the solid-state image pick up element, wherein said first reference surface maintained in contact with the face of said solid-state image pick up element is located inside said recess, and wherein said second reference surface is located outside of said recess.

7. An image reading device according to claim 6, wherein said light receiving surface and said face of said image pick up element both are located in said recess.

* * * * *